United States Patent
Bertetti et al.

[11] Patent Number: 5,215,387
[45] Date of Patent: Jun. 1, 1993

[54] SUPPORT UNIT FOR AN IDLING ELEMENT SUCH AS THE NONDRIVEN WHEEL OF A MOTOR VEHICLE

[75] Inventors: Paolo Bertetti; Angelo Vignotto, both of Turin, Italy

[73] Assignee: SKF Industrie S.P.A., Airasca, Italy

[21] Appl. No.: 831,824

[22] Filed: Feb. 6, 1992

[30] Foreign Application Priority Data

Mar. 1, 1991 [IT] Italy ................................. 47/91[U]

[51] Int. Cl.$^5$ ............................................. F16C 19/08
[52] U.S. Cl. .................................................... 384/544
[58] Field of Search ............... 384/544, 589, 537, 540, 384/585, 584

[56] References Cited

U.S. PATENT DOCUMENTS

| | | | |
|---|---|---|---|
| 4,723,851 | 2/1988 | Troster et al. | 384/544 |
| 4,786,115 | 11/1988 | Ashberg | 384/544 |
| 4,835,829 | 6/1989 | Welschof et al. | 384/589 |
| 4,958,944 | 9/1990 | Hofmann et al. | 384/544 |

*Primary Examiner*—Lenard A. Footland
*Attorney, Agent, or Firm*—Eugene E. Renz, Jr.

[57] ABSTRACT

Support unit for a free running element, especially a nondriving wheel of a vehicle, consisting of a first and second support element mounted coaxially and rotatably relative to each other; a first pair of opposing annular raceways cooperating by angular contact with the first set of rolling elements and provided externally on the first support element and internally on the second support element; an annular element carried externally on the initial support element; a second pair of opposing annular raceways cooperating by angular contact with the second set of rolling elements and provided externally on the annular element and internally on the second support element, half-cones engaging in an annular groove provided externally in the first support element and cooperating with the annular element to hold it in cooperation with the second set of rolling elements; and a retaining ring capable of holding the half-cones engaged in the annular groove of the first support element, characterized in that said retaining ring is fixed exclusively to said annular element.

5 Claims, 1 Drawing Sheet

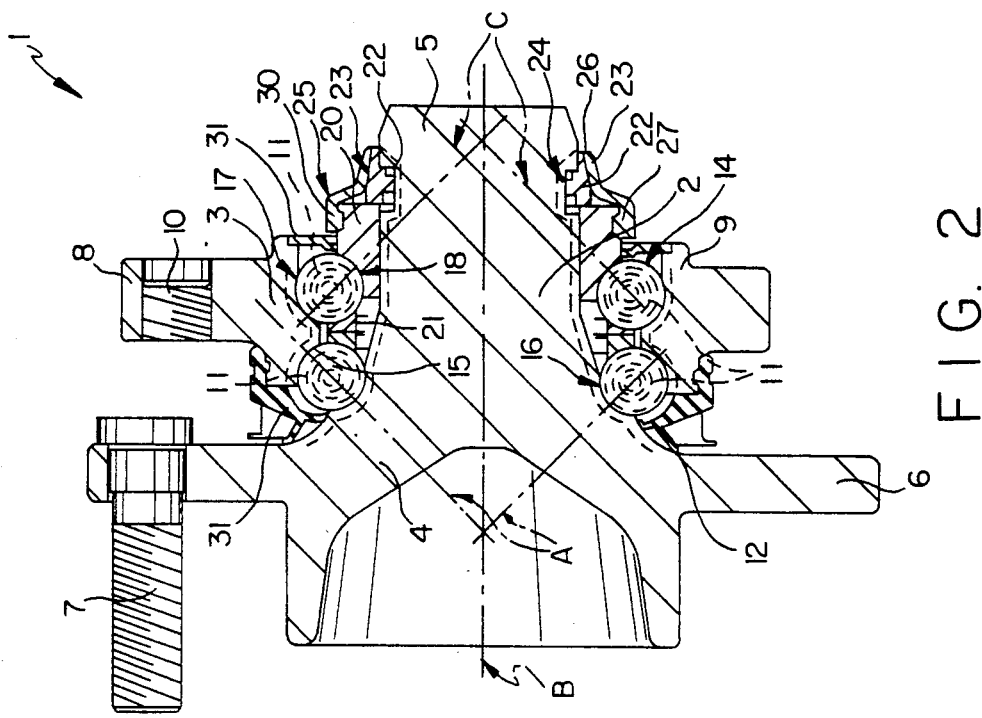
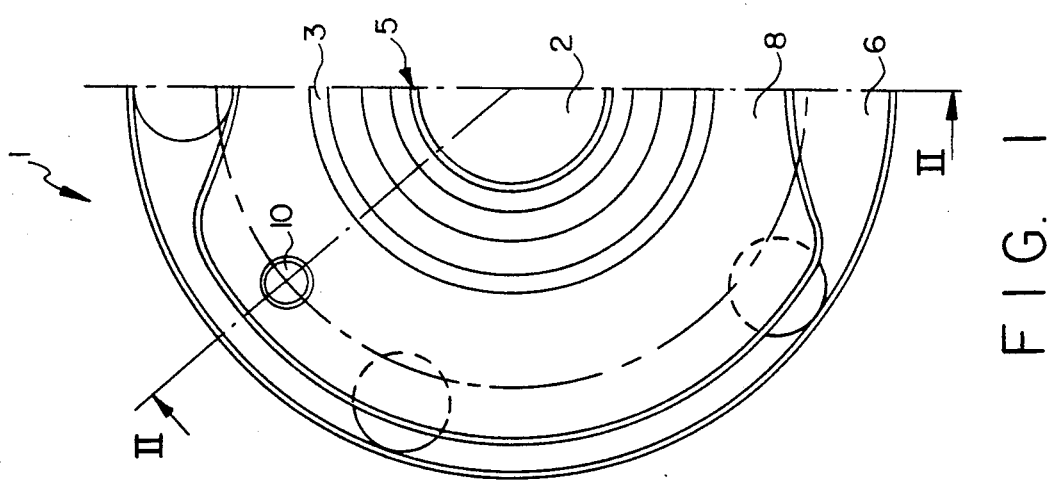

SUPPORT UNIT FOR AN IDLING ELEMENT SUCH AS THE NONDRIVEN WHEEL OF A MOTOR VEHICLE

FIELD OF THE INVENTION

The present invention relates to new and useful improvements in support units for mechanical elements and specifically to improvements in a so-called integrated wheel support unit for the non-Driving wheel of a motor vehicle.

BACKGROUND OF THE INVENTION

Support units of the type to which the present invention relate usually consist of an angular contact bearing consisting of two sets of balls and wherein the internal and the external rings are equipped on opposite sides with attachment flanges by which the assembly is mounted to the suspension support of the vehicle and by which the wheel is also fixed to the assembly. In the case of nondriven wheel assemblies, the internal ring of the bearing is replaced by a solid cylindrical element or spindle. In order to accommodate a large number of rolling elements between the rings of the bearing, and thereby to support heavy loads with reduced dimensions, the spindle is usually made in two pieces and one of the raceways is provided on the spindle itself namely the inner raceway for the first set of balls and a second raceway for the second set of balls is provided by a separate ring mounted on the spindle. In the presently known assemblies, this ring is mounted loosely or with a slight play so that the clearance between the raceway and the rolling elements can be checked during the mounting procedure.

British Patent No. 1,570,849 shows a mounting arrangement wherein a ring of the type described above is held in position by half-cones or by a plurality of ring segments with a conical external lateral surface which are supported in a groove in the spindle by a retaining ring integral with the spindle itself. Even though this mounting arrangement is generally satisfactory, there are nevertheless certain disadvantages and drawbacks. For example, by reason of the play between the ring on the internal raceway and the spindle to allow for adjusting gaps between the raceway and the rolling elements, a relative rotational movement takes place between the ring and the half-cones, which leads to premature wear of these elements. This may also occur in a hypothetical situation that it is possible to eliminate the problem of play/ball adjustment and it is consequently possible to force fit the ring on the spindle due to the play that inevitably results in use as a result of wear.

SUMMARY OF THE INVENTION

With the foregoing in mind, it is the object of the present invention to provide a support unit for a loose or idling element, such as the nondriven wheel of a motor vehicle which obviates the shortcomings of prior mounting systems described above and is characterized by novel features of construction and arrangement facilitating adjusting the play to obtain optimum use of the space available for the rolling elements.

This goal is achieved by the present invention which provides a support unit for a loose element such as the nondriven wheel of a motor vehicle and comprises generally first and second support elements mounted coaxially and rotationally and first and second sets of rolling elements in the annular space between the support elements. The support elements include opposing raceways providing an oblique contact surface for the first set of rolling elements located externally on the first support element and internally on the second support element. An annular element is mounted externally on the first support element and a pair of opposing second annular raceways providing an oblique contact with the second set of rolling elements is provided externally on the annular elements and internally on the second support element respectively. Half-cone elements engage* in annular groove provided externally in the first support element and cooperating in step with said annular element to maintain it in contact with said second set of rolling elements. A retaining ring keeps the half-cones engaged in the under groove in the first support element whereby the retaining ring is fixed solely and exclusively to the annular element.

BRIEF DESCRIPTION OF THE DRAWINGS

These and other objects of the present invention and the various features and details of the operation and construction thereof are hereinafter more fully set forth with reference to the accompanying drawings, where:

FIG. 1 is a front elevational view of a support unit constructed in accordance with the present invention divided in half along a center line for simplicity of showing; and FIG. 2 is a enlarge sectional view taken on lines 2—2 on FIG. 1.

DETAILED DESCRIPTION OF THE PREFERRED EMBODIMENT

Referring now to the drawings and particularly FIGS. 1 and 2 thereof, there is illustrated a support assembly generally designated by the numeral 1 constructed in accordance with the present invention. The support assembly 1 is adapted for use with any free running mechanical element and in the present instance has a useful application as a support for a nondriven wheel of a motor vehicle or a pulley. The support assembly 1 comprises a first support element such as a cylindrical spindle 2 and a second support element in the form of cylindrical ring 3 mounted coaxially on the spindle 2 and rotatable with respect thereto. The free running element to be supported, for example, the nondriven wheel of motor vehicle is mounted on the flange 6 by suitable fasteners such as screws. The external ring is likewise provide with a complementary flange 8 formed integrally with the ring 3 having an axial end face 9 confronting axial end 4 of the spindle 2. The support assembly 1 can be fixed by the flange 8 by means fasteners engaging through tapped holes 10 to a support structure, such as the support standard for the nondrive wheel of a vehicle or if the flange 6 is designed to support a pulley then to the conventual support frame of the pulley.

Spindle 2 is mounted in a free wheeling manner internally of the ring 3 through which it passes by a plurality of rolling elements, such as balls 11, located in the annular space between the outer peripheral surface of the spindle 2 and the ring 3. Balls are arranged radially to form rows of rolling elements designated 12 and 14 respectively which make angular contact with elements 2 and 3. The row 12 of rolling elements cooperates with a pair of opposing annular raceways 15 and 16 and the rollers of the row 14 cooperates with a pair of opposing annular raceways 17 and 18. In the embodiment illustrated, the raceways 15 and 16 are provided on axial end 4 of the spindle 2 and are axially offset so that the contact axes between them and the balls 11 designated A—A and B—B converge towards the axis of symmetry and rotation of spindle 2 as indicate by B. The axes A—A and B—B are the axes 2 along which the thrust passes between the elements 2 and 3. Raceway 17 and 18 are arranged as mirror images of the raceways 15 and 16 at the opposite axially end 5 of the spindle 2 and are likewise axially offset so that the contact axes X—X and Y—Y between them and the balls indicated by the letter C converge toward axis B at the axially end 5 of the spindle 2.

In summary the combination of elements 2, 3 and 11 and the associated raceways 15, 16, 17 and 18 defines a roller bearing of the angular contact type with two rows of balls.

The axial end 5 of the spindle 2 projects from the outer end 3 at one axially end face 9 thereof. Raceways 15 and 16 are provided on the internal surface of element 3 and on the external surface of spindle 5 adjacent the flange 6. Even though raceway 17 is always provided on the internal surface of the ring 3 adjacent to raceway 15, raceway 18 is provided on an annular element 20 which is not a part of the spindle 2 but which is mounted externally of the spindle, in the present instance, with a certain limited freedom capable of assuring a small prefixed radial play thereby permitting adjusting the clearance between the balls 11 and raceways 15, 16, 17 and 18. By this construction it is possible to provide a large number of balls between the elements 2 and 3. For example, in assembling the elements, the row 12 of balls can be installed first directly on the spindle 2. Then, the outer ring 3 is mounted by inserting it axially over the spindle 2 from the axially end 5. In this instance the raceways 15 and 16 are provided at the axial end 4 of the spindle and are axially offset and ring 3 is mounted by inserting it axially on to spindle 2 from the axially end 5, thus forming the row 14 of the balls. Finally, ring 20 is mounted on spindle 2 by axial insertion for axially end 5. During assembly and afterwards the balls 11 are held in position by a conventional cage 21.

According to an important feature of the present invention, the ring or annular element 20 is held axially on spindle 2 after its insertion and is locked against the balls of the row 14 by means of two or more half-cones 22 comprising as illustrated ring segments delimited by conical external lateral surface 23 and the conicity tapering toward axially end 5 of the spindle 2. Half-cones 22 engaged at their radially internal portions in an annular groove 24 provided externally in the axially end 5 of spindle 2 in such a way that the half-cones 22 when engaged in place axially lock on the spindle 2 and can cooperate in turn with the ring 20 to hold it in position against the balls 11 between the outer ring 3 and the groove 24. The half-cone elements 22 which are inserted radially from the exterior into the groove 24 after installation of element 20 are in turn held in position and groove 24 by a retaining ring 25.

Retaining ring 25 as illustrated is in the form of a cup-shaped element of sheet metal which according to a principal feature of the present invention is fixed exclusively to the annular element 20. More particularly, the retaining 25 is drawn with play on axial end 5 of the spindle 2 with its concave end facing axial end 4 in such a way that a first truncated-conical portion contacts conical lateral surface 23 of half-cones 22, radially locking them from the outside in groove 24. Radial element 25 is loaded on annular element 20 by means of a outer shield section 27 of greater diameter than the retaining ring 25 which, for example, is wedged on the external lateral surface of annular element 20 and fits in the annular recess 30 provided therein.

As is customary, the balls are protected by conventional seal assemblies 31 which are carried on the outer ring 3 and cooperates with spindle 2 and on the opposite side with ring 20. Considering now operation of the unit described, retaining element 25 not only holds the half-cones in groove 24 thus maintaining unit 1 in the assembled state but also assures an angular connection by friction between half-cones 22 and element 20 on which element 25 is fixed. By this simple expedient, the shortcoming of the prior art discussed above is completely eliminated because any relative rotation between half-cone 22 and ring 20 around axis B is prevented by the retaining element 25 which thus performs another function with respect to known support units as described above in connection with British No 1,578,049. Premature wear in the operation of elements 20 and 21 possible in similar units of the prior art is thus avoid.

While particular embodiments of the present invention have been illustrated and described herein, it is not intended to limit the invention in changes and modifications may be made therein within the scope of claims.

What is claimed is:

1. Support unit for a free running element, comprising a first and second support element mounted coaxially and rotatably relative to each other;
    a first pair of opposing annular raceways cooperating by angular contact with the first set of rolling elements and provided externally on the first support element and internally on the second support element;
    an annular element carried externally on the first support element;
    a second pair of opposing annular raceways cooperating by angular contact with the second set of rolling elements and provided externally on the annular element and internally on the second support element, half-cones engaging in an annular groove provided externally in the first support element and cooperating with the annular element to hold it in cooperation with the second set of rolling elements; and
    a retaining ring capable of holding the half-cones engaged in the annular groove of the first support element, characterized in that said retaining ring is fixed exclusively to said annular element.

2. Support unit according to claim 1, characterized in that the first and second support elements consist, respectively, of a radially internal spindle provided at a first end with a first means of coupling and a radially external ring, provided at a second end opposite the first one with a second means of connection;
    in that the first annular raceways being provided at the first end of the spindle, axially offset so that the contact axes between the first raceways and the rolling elements of the first set of balls converge toward the axis of the spindle at the first end of the spindle; and
    in that the second raceways are provided at the other end of the spindle, opposite the first and passing through the external ring, axially offset so that the axes of contact between the second raceways and the rolling elements of the second set of balls converge toward the axis of the spindle at the other end of the spindle.

3. Support unit according to claim 2, characterized in that the annular element and the annular groove are located on the other or second end of the spindle, the half-cones axially locking the annular element between the external ring and the annular groove and being delimited radially on the outside by a conical lateral surface, the conicity tapering down toward the second end of the spindle.

4. Support unit according to claim 3, characterized in that the retaining ring is embodied as a cup-shaped element of sheet metal, which is drawn with play onto the second end of the spindle with the concavity facing the first end, so that a truncated-conical first portion cooperates in turn with the conical lateral surface of the half-cones to radially enclose the half-cones in the annular groove from the outside.

5. Support unit according to claim 4, characterized in that a second portion, of larger diameter, of the retaining ring is wedged on an external lateral surface of the annular element in corresponding with an annular recess provided therein.

* * * * *